United States Patent [19]

Wampole

[11] 4,118,278

[45] Oct. 3, 1978

[54] NUCLEAR REACTOR INSULATION AND PREHEAT SYSTEM

[75] Inventor: Nevin C. Wampole, Latrobe, Pa.

[73] Assignee: The United States of America as represented by the United States Department of Energy, Washington, D.C.

[21] Appl. No.: 727,081

[22] Filed: Sep. 27, 1976

[51] Int. Cl.² .............................................. G21C 13/10
[52] U.S. Cl. ...................................... 176/87; 176/38; 52/224
[58] Field of Search ....................... 176/38, 40, 50, 87; 220/3, 9 D; 52/224, 298

[56] References Cited

U.S. PATENT DOCUMENTS

| | | | |
|---|---|---|---|
| 3,155,595 | 11/1964 | Schluderberg | 176/65 X |
| 3,188,799 | 6/1965 | Flynn | 176/DIG. 3 |
| 3,396,079 | 8/1968 | Finzi et al. | 176/87 |
| 3,453,177 | 7/1969 | Bilsborough et al. | 176/50 |
| 3,930,939 | 1/1976 | Bittermann et al. | 176/87 X |
| 3,991,899 | 11/1976 | Vaessen | 176/38 X |

Primary Examiner—Peter A. Nelson

[57] ABSTRACT

An insulation and preheat system for preselected components of a fluid cooled nuclear reactor. A gas tight barrier or compartment of thermal insulation surrounds the selected components and includes devices to heat the internal atmosphere of the compartment. An external surface of the compartment or enclosure is cooled, such as by a circulating fluid. The heating devices provide for preheating of the components, as well as maintenance of a temperature sufficient to ensure that the reactor coolant fluid will not solidify during shutdown. The external cooling limits the heat transferred to other plant structures, such as supporting concrete and steel. The barrier is spaced far enough from the surrounded components so as to allow access for remote or manual inspection, maintenance, and repair.

7 Claims, 1 Drawing Figure

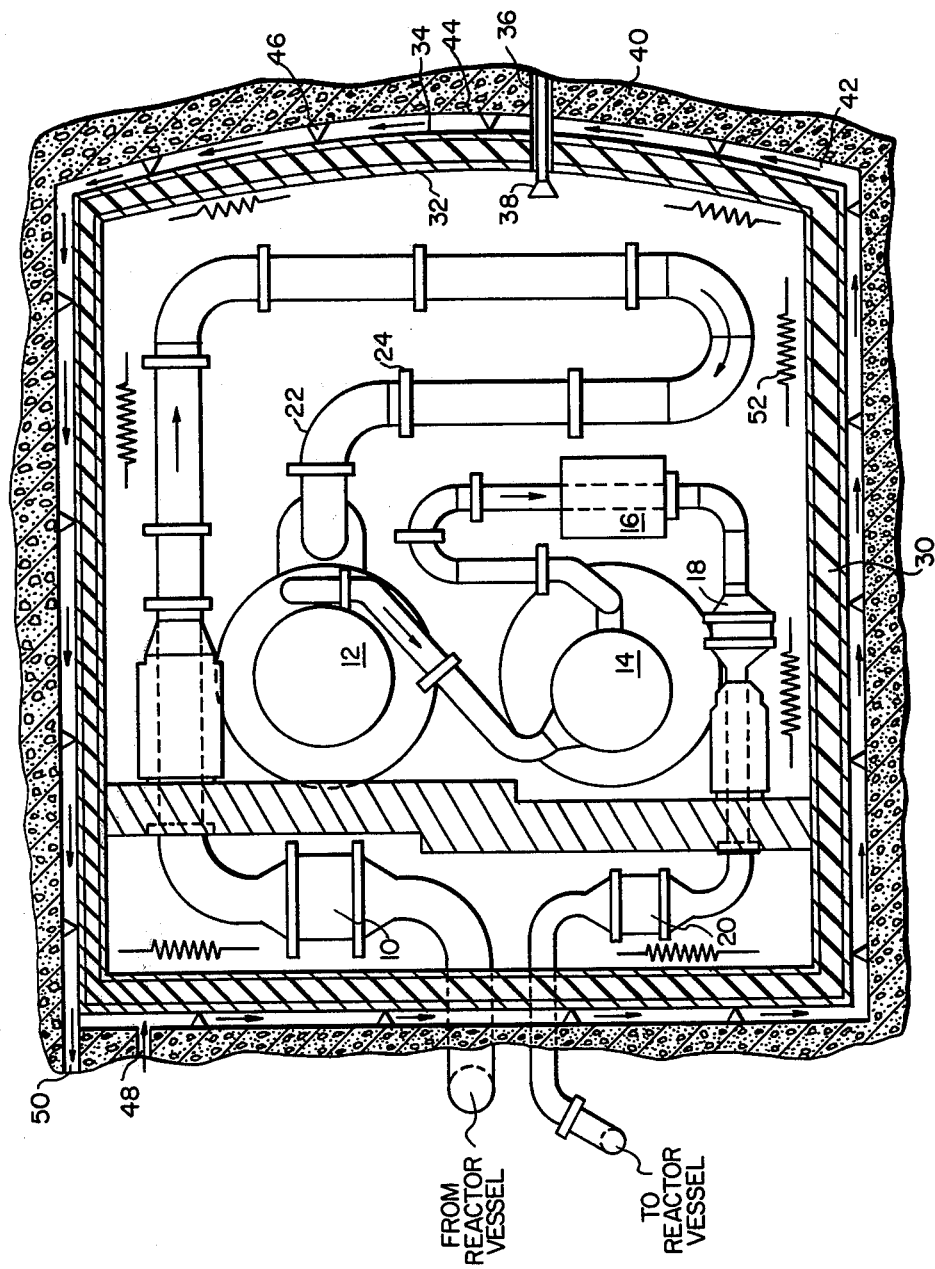

NUCLEAR REACTOR INSULATION AND PREHEAT SYSTEM

The invention described herein was made in the course of, or under, a contract with the United States Energy Research and Development Administration, the successor in interest to the United States Atomic Energy Commission.

BACKGROUND OF THE INVENTION

1. Field of the Invention:

This invention relates to nuclear reactors, and more particularly provides an insulation and preheat system for selected reactor components within which circulates a fluid coolant.

2. Description of the Prior Art:

In a nuclear reactor, and in the particular exemplary liquid metal cooled nuclear reactor, components through which the liquid metal circulates must be insulated. Insulation is required to minimize waste of thermal power generated in the reactor, to limit the heating of adjacent structures such as concrete and steel supports, and to allow the components to be maintained above the freezing point of the liquid metal coolant during reactor shutdown. Presently, close-fitting thermal insulation is typically installed directly onto the components. For example, insulating material contained between two stainless steel sheets is attached about the components by steel bands. In order to maintain the components above the coolant freezing temperature, resistance heaters or heat tracing are installed in an annular region, typically about one inch in depth, between the insulation and the component surface. In order to limit heating of supporting structures, a cooled nitrogen atmosphere is typically circulated through a concrete cell structure surrounding the insulated components. A similar prior art preheat and cooling system is described in U.S. Pat. No. 3,155,595, in the name of D. C. Schluderberg.

Although these present systems adequately perform the required functions, they are not without deficiencies. Foremost, as a result of the stringent regulatory and industrial safety oriented inspection requirements imposed upon nuclear facilities, periodic in-service inspections are performed. These include routinely scheduled visual inspection of the outer surface of accessible reactor components. It will be readily apparent that the close fitting insulation systems presently in use make such inspections extremely difficult and time consuming. Lack of inspectability of certain components due to the presence of the close-fitting thermal insulation may prove unacceptable in the future.

Further, the capital cost associated with present systems are high. A large number of electrical trace heaters are required in order to distribute the heating evenly over the insulated components and thereby minimize thermal stresses during preheating. This further requires a large amount of electrical circuitry, including wires, penetrations, junction boxes, switchgear, and so forth, to power and control the trace heaters. Further, a large number of automatic temperature controllers and thermocouples are needed to regulate the heatup of the components.

Additionally, should the heaters burn out or require maintenance, they are not readily accessible. Also, connecting auxiliary components are typically insulated and trace heated separately, further complicating the system.

It therefore is highly advantageous in terms of safety, cost, time and ease of maintenance, to provide an insulation and preheat system which overcomes the above-listed deficiencies.

SUMMARY OF THE INVENTION

This invention provides an insulation and preheat system for a nuclear reactor which overcomes many of the deficiencies of the prior art. The system includes a fluid tight compartment with walls made of thermal insulating material. The compartment loosely surrounds selected reactor components, including piping, which contain and circulate a fluid coolant such as a liquid metal. The compartment walls are spaced from the surrounded components at a distance which allows access for remote and, if desired, manual inspection. In this sense the insulating walls form a sealed, enclosed, insulated compartment or room about the components. Heating devices, such as electrical resistance heaters, are also included which heat the compartment internal atmosphere when in use. The outside surface of the compartment walls are cooled, such as by a cooling fluid circulated in an annular space about the compartment walls. For increased safety, the compartment internal atmosphere preferably includes a gas inert to the reactor coolant, such as nitrogen, argon, or helium.

During reactor operation the temperature inside the compartment walls need not be actively controlled. The entire interior atmosphere will be at a temperature determined by the heat generated by the surrounded components. The temperature distribution will therefore be relatively even. The structures external to the compartment or room, such as concrete and steel cell walls, are maintained at an acceptably low temperature by the insulated walls and the cooling fluid circulating between the compartment walls and the cell walls.

When the reactor is shut down, the heating devices can be energized to maintain the internal compartment atmosphere at a temperature above the freezing point of the coolant. Furthermore, when initially filling the reactor components with coolant, the heating devices can be energized to preheat the surrounded components from a cold condition to a temperature above the coolant freezing temperature. This preheating will be relatively evenly distributed to all of the components within the insulated compartment or enclosure.

It will be readily apparent that with at least some of the compartment walls spaced sufficiently far from the selected components, remote or manual inspection, maintenance, or repair of the components is easily accomplished, unburdened by the need to remove close-fitting insulation.

BRIEF DESCRIPTION OF THE DRAWING

The advantages of the invention will become more apparent from the following description taken in connection with the accompanying FIGURE which is a schematic plan view, in section, of application of the invention.

DESCRIPTION OF THE PREFERRED EMBODIMENTS

The invention is herein described in reference to a loop-type liquid metal cooled nuclear reactor. It is to be understood, however, that the particular example is merely illustrative, and that the invention can advantageously be utilized in any reactor plant, and with any reactor components, where insulation is desirable.

Shown in the FIGURE are selected components of a primary loop of an exemplary liquid metal cooled fast neutron reactor, including a hot leg isolation valve 10, a primary pump 12, a heat exchanger 14, a flow meter 16, a check valve 18, a cold leg isolation valve 20, and connecting piping 22 and piping supports 24. During operation reactor coolant, such as liquid sodium, flows from a reactor vessel (not shown) containing a nuclear core through the piping 22 to the pump 12, then to the heat exchanger 14 where energy is transferred directly or indirectly to apparatus for generation of power, such as to a steam cycle, and the coolant is then returned to the reactor vessel completing the circuit. Typically a plurality of primary loops, each including a heat exchanger and pump, are flow connected to a common reactor vessel housing the nuclear core.

Shown surrounding the illustrative components are fluid tight walls of thermal insulation 30. The walls 30 may be comprised of insulating materials well known in the art. The walls 30 can be structurally self-supporting, or may be supported by cell walls 40 surrounding the components. Preferably the insulation is chemically compatible with the reactor coolant fluid so as to avoid chemical attack in the unlikely event of component leakage or rupture. This can be accomplished, for example, by including as part of the walled compartment 30 a metallic inner wall shell 32 and a metallic outer shell 34, such as stainless steel. In this preferred composition, only the outer shell 34 need be fluid tight.

The insulation component or room is loosely spaced from the compartment it surrounds a distance sufficient to allow remote or manual visual inspection of all, or preselected critical areas, of the components. It can therefore be described as an insulated room about the components. The walls 30, therefore, can also be provided with a sealed manway (not shown) and/or sealed penetrations 36 for viewing and sampling apparatus such as television 38, periscope, and chemical sampling monitors. Insulated sealed penetrations can also be utilized for passage of electrical leads and support structure.

The walled 30 compartment as shown surrounded by a concrete cell 40 from which the components and the walls 30 can be structurally supported. To maintain structural integrity of the concrete 40, it must be maintained at a temperature below about 140° F. Therefore, in addition to the insulated walls 30, a means for cooling all or selected portions of the walls 30 are provided. Shown in the FIGURE is an annular cooling duct 42, disposed between the concrete 40 and the walls 30, which can also include a gas tight metal shell 44 and which is spaced from the concrete by separators 46. A cooling fluid is circulated through the cooling duct 42. For enhanced safety, the fluid is preferably inert to the duct and the reactor coolant, such as nitrogen, atom, or helium gas. Nitrogen is preferred because of its relatively low cost and high availability. The duct 42 communicates with heat transfer apparatus (not shown) through an inlet 48 and outlet 50. A cooling liquid, identical with or chemically compatible with the reactor coolant can also be circulated through the ducts 42.

The internal atmosphere of the compartment or barrier also preferably is made up of a gas inert to the coolant and the surrounded components, such as nitrogen. It need not be circulated during normal operation. It can, however, be monitored for evidence of coolant leakage. Also provided within the walled 30 compartment are means for heating the internal atmosphere such as the electrical resistance heaters 52 connected to external actuators by means well known in the art. Combustion type heaters may be used as a source of heat external to the compartment by circulating the internal atmosphere through a closed circuit to the external heat source.

The heating means, such as the resistance heaters 52 are advantageously utilized to preheat the selected components within the compartment prior to filling with coolant. As it is the atmosphere surrounding the components that is heated, the preheating is substantially evenly distributed to the components, minimizing thermal stresses which can occur with more localized preheating methods. Further, providing capability to evenly preheat or maintain an elevated temperature among selected components is highly beneficial in a liquid metal cooled reactor. For example, in a sodium cooled reactor the sodium coolant can be maintained above the coolant freezing point (approximately 208° F., 98° C.) while maintenance, repair or refueling operations are being performed.

There has therefore been disclosed an insulation and preheat system that insulates reactor components and thereby minimizes waste of thermal power generated by the reactor, limits the heating of concrete and steel support structures, provides for maintaining reactor coolant above its freezing temperature during reactor shutdown and for evenly preheating reactor components, and which further provides accessibility for remote or manual inspections and maintenance. Major inspections or maintenance would typically involve draining the coolant from the reactor components, cooling the components to ambient temperature, and changing the compartment atmosphere from an inert gas to air. Manual access can then be had without removal of insulation. In the unlikely event of a suspected coolant leak within the compartment, it would be more desirable initially not to allow air into the cell. In this event, a self-contained breathing apparatus would be used to allow manual access into the inerted compartment.

It will be apparent that many modifications and additions are possible in view of the above teachings. For example, the selected components included within the barrier or compartment can be varied, and can include the core-containing reactor vessel. Also, the shape of the barrier is variable, as long as sufficient spacing is maintained between the walls and the components at preselected locations as dictated by maintenance and inspection. Also, the system can be applied to auxiliary reactor components. And, by circulating the compartment atmosphere through cooling heat exchange apparatus, the system can be used to remove decay heat from the reactor plant components. It therefore is to be understood that within the scope of the appended claims, the invention may be practiced other than as specifically described.

I claim:

1. In a nuclear reactor having components for circulating a liquid coolant, an insulation and preheat system comprising:
   (a) a fluid tight compartment of thermal insulation surrounding preselected portions of said components and spaced therefrom an extended distance so as to facilitate visual inspection;
   (b) a supplemental heating device disposed within said compartment for heating the internal atmosphere of said compartment so that said preselected components are substantially evenly heated; and (c) means for cooling an outer surface of said insulated compartment.

2. The system of claim 1 wherein said atmosphere within said compartment comprises a gas inert to said coolant and the internal surface of said thermal insulation.

3. The system of claim 1 wherein said heating means comprise electrical resistance heaters disposed within said compartment.

4. The system of claim 1 wherein said cooling means comprise an annular duct about said compartment circulating a cooling fluid inert to said compartment.

5. A method of insulating and preheating preselected components of a nuclear reactor circulating a liquid coolant comprising:

(a) enclosing said components in a fluid tight compartment of insulation spaced an extended distance from said components;

(b) selectively heating the interior of said fluid tight compartment by a supplemental heating device disposed within said compartment; and (c) selectively cooling the exterior of said compartment.

6. In a nuclear reactor having components for circulating a liquid coolant disposed within a concrete cell, an insulation and preheat system comprising:

(a) a fluid tight compartment of thermal insulation disposed within and generally contoured to said cell;

(b) a supplemental heating device disposed within said compartment for heating the interior of said compartment; and (c) means for cooling the exterior of said compartment.

7. In a nuclear reactor having components for circulating a liquid coolant, an insulation and preheat system comprising:

(a) a fluid tight barrier of thermal insulation forming a walled room about preselected portions of said components;

(b) a supplemental heating device disposed within said room for heating the internal atmosphere within said room; and (c) means for cooling the exterior of said room.

* * * * *